Oct. 21, 1930.  E. T. McNANEY  1,779,046
OYSTER CLEANING MACHINE
Filed May 24, 1928   3 Sheets-Sheet 2
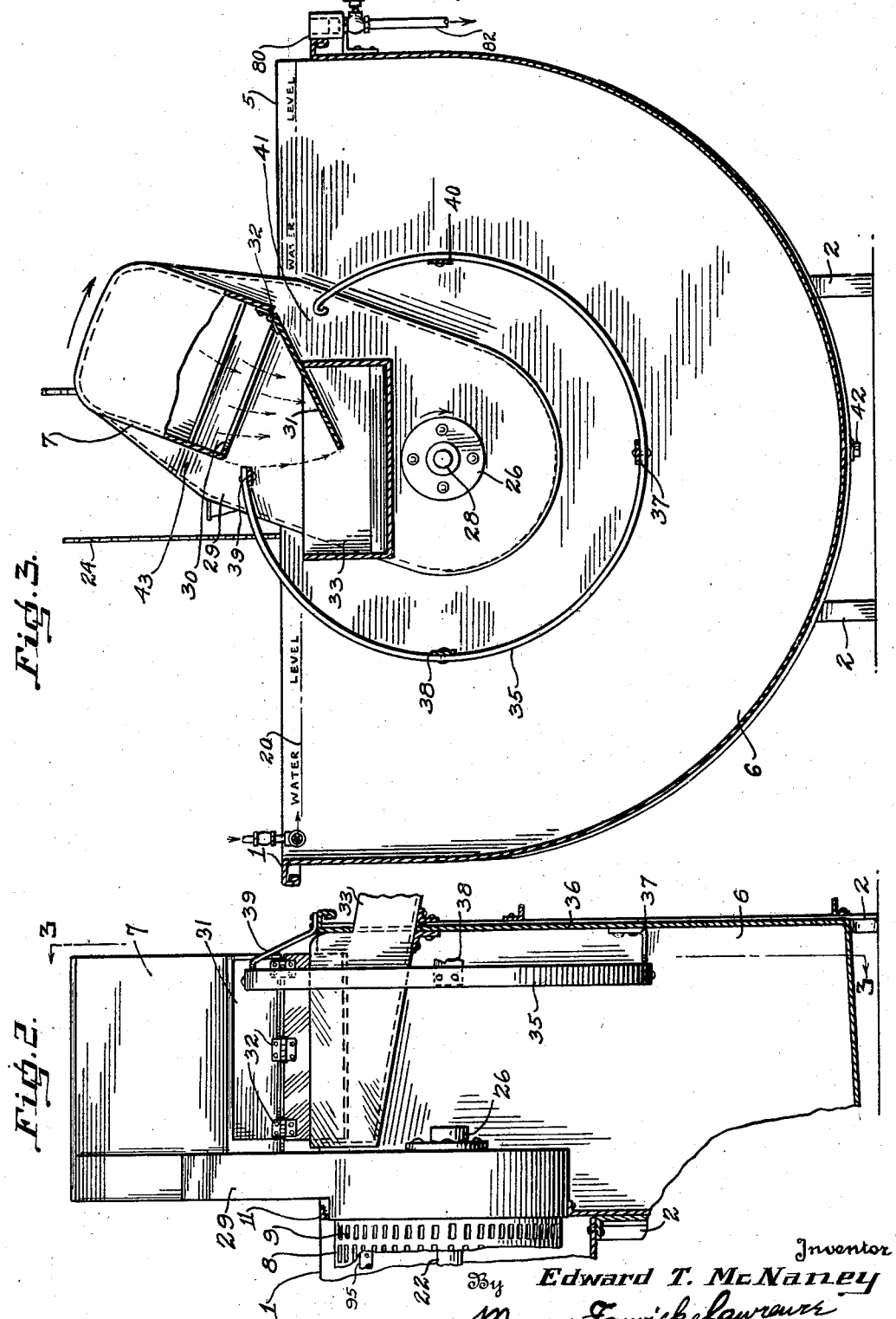
Inventor
Edward T. McNaney
By Mason Fenwick & Lawrence
Attorneys

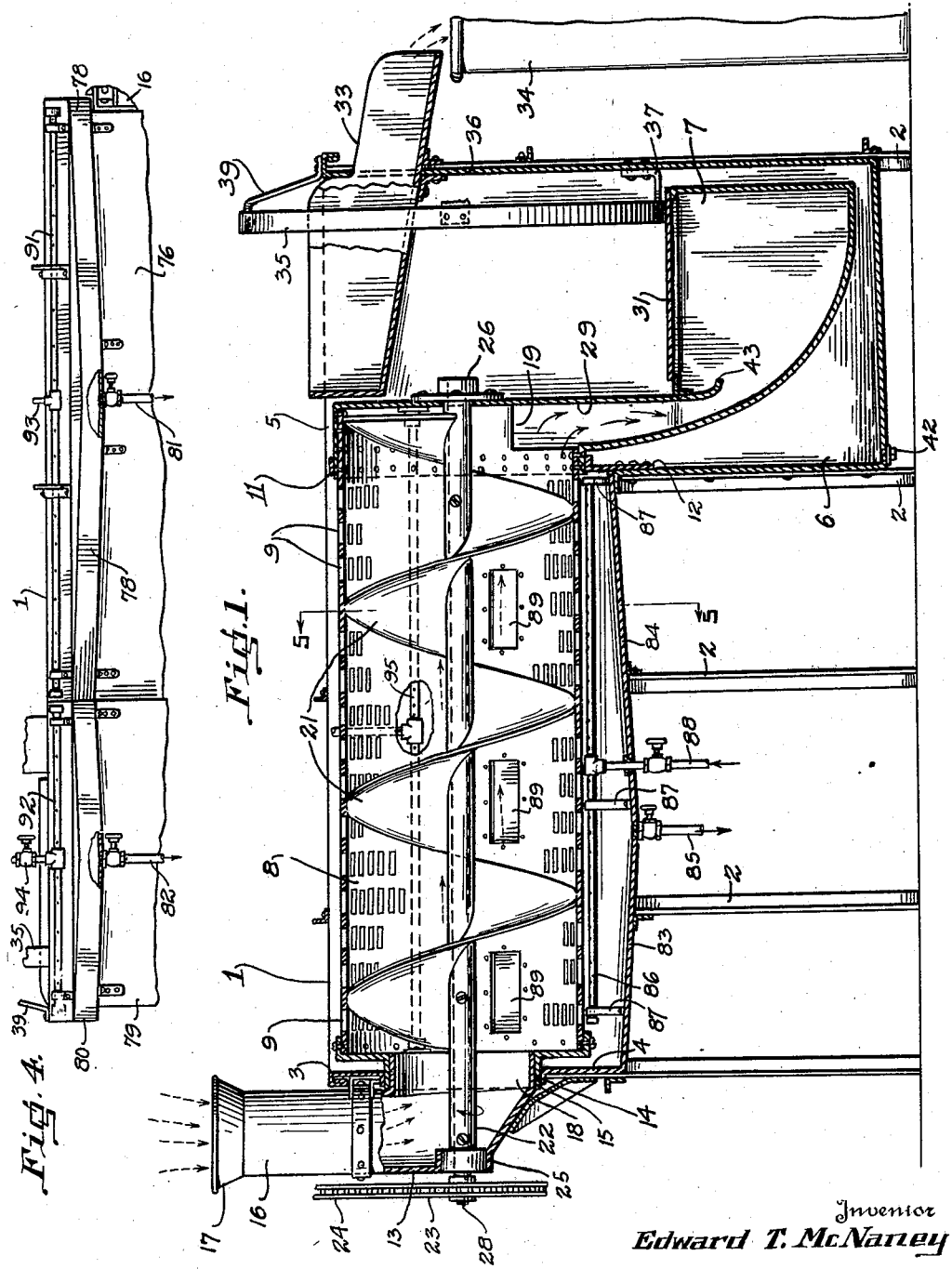

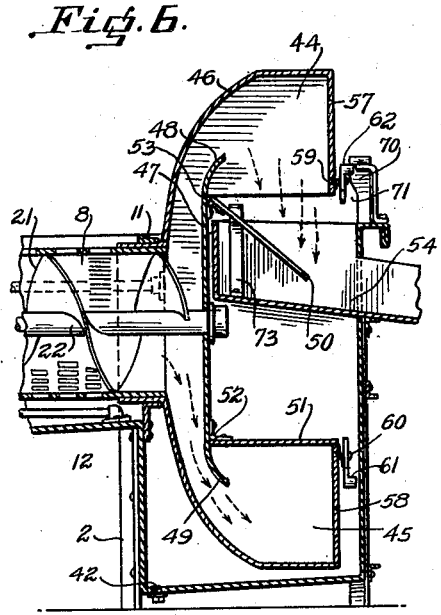
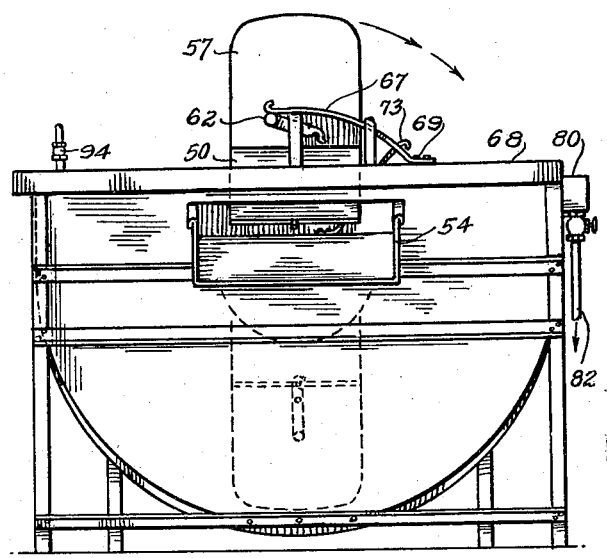
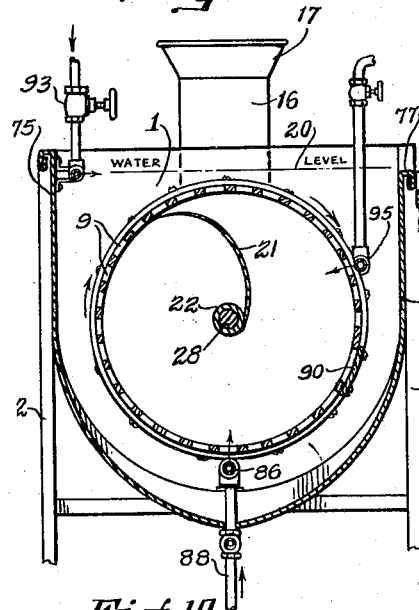
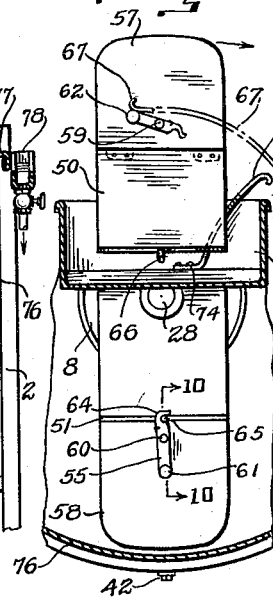
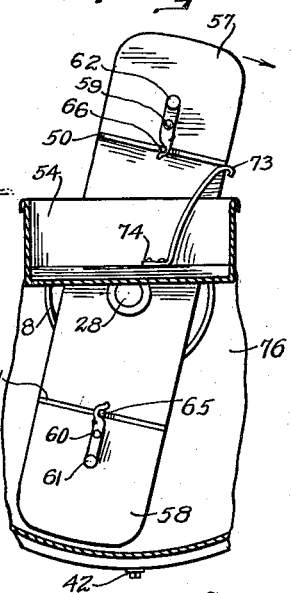
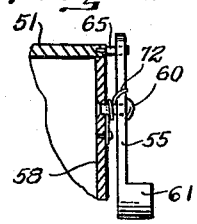

Patented Oct. 21, 1930

1,779,046

UNITED STATES PATENT OFFICE

EDWARD T. McNANEY, OF BALTIMORE, MARYLAND

OYSTER-CLEANING MACHINE

Application filed May 24, 1928. Serial No. 280,209.

This invention relates to improvements in food cleaning machines, particularly in an apparatus for cleaning and washing the shelled oysters.

One of the principal objects of this invention is to provide an oyster washing and cleaning machine which will function to receive the uncleaned oysters and deliver them practically free from dirt and rinsing or wash water into a suitable receptacle.

Another object of this invention is to provide a food cleaning device whereby the uncleaned or unwashed food is received into the machine and is circulated therein through a suitable quantity of rinsing or wash water, and then delivered into a portion of the apparatus which lifts the food above the level of the liquid and delivers it therefrom into a receptacle.

A further object of this invention is to provide a cleaning machine for oysters wherein the scum and dirt which forms on the surface of the washing liquid is efficiently disposed of, means for aerating the liquid being suitably located within the tank.

Other objects of this invention will appear from the following detailed description of the device as disclosed in the three sheets of drawings which are herewith made a part of this application.

In the drawings:

Fig. 1 illustrates a sectional side elevational view of the food cleaning machine, disclosing the different members assembled in operative relationship.

Fig. 2 represents a side elevational view of the delivery end of the food washing and cleaning machine, disclosing particularly the delivery chute and the means for bringing the food to the point where it is delivered therein.

Fig. 3 illustrates an end elevational view of Figure 2, taken along line 3—3.

Fig. 4 represents an elevational view of a portion of the tank, disclosing particularly the trough or gutter member adapted to receive the overflow of the liquid on the low side of the tank.

Fig. 5 illustrates a sectional view of Figure 1 taken along line 5—5.

Fig. 6 represents a modification of this invention disclosing a sectional elevational view of a double-ended scoop member for receiving the food, one of the scoop members being arranged to receive the oysters or food as they deliver from the tank, while the other scoop member is functioning to deliver the washed and cleaned oysters or food into the delivery chute.

Fig. 7 illustrates an end view of Figure 6.

Fig. 8 represents a sectional elevational view of a portion of the scoop member and delivery chute, disclosed in Figure 6, and particularly illustrating the means for allowing the oysters or food to flow from the scoop into the delivery chute.

Fig. 9 discloses a view of Figure 8, showing the scoop door in closed position just after the delivery of the oysters into the chute.

Fig. 10 illustrates a sectional view of Figure 8 taken along line 10—10, disclosing the latch means for holding the scoop door in closed position, and the lug member attached thereto for cooperating with the cam element which functions to allow the door to open and close.

In order to provide an improved means for cleaning and washing food, such as shelled oysters, it is preferred in this invention to provide a tank 1, made of any proper material, such as sheet metal, and supported on a floor or foundation by means of members 2, which may be of angle iron construction, or otherwise. The tank 1 is formed having one end wall 3 properly braced by means of angle iron reinforcing elements 4, the opposite end of the tank 1 is securely connected to an auxiliary tank portion 5, which has a downwardly extending section 6 adapted to receive in rotatable relationship therein a scoop member 7, which is brought into open communication with the cylinder member 8, having a plurality of perforations through its cylindrical surface, as designated by the numeral 9.

The cylinder 8 is rotatably mounted within the tank 1, in any suitable manner such as that disclosed in Fig. 1, wherein one end of the cylinder 8 is rotatably held in position by means of bearing member 11 and plate portion 12, securely fastened to a side wall of tank section 5, the opposite end of the cylinder 8 being preferably supported by an inlet portion 13, having a collar portion 14, adapted to be received loosely within the inner end 15 of the cylinder 8, the chute 16 being provided for the purpose of delivering food into the cylinder, the upper end of the chute 16 having a funnel shaped member 17 of the usual type.

The inner end 15 of the cylinder 8 may be rotatably mounted in any suitable manner, and the chute 16 may be held firmly in fixed relationship to the tank 1, by means of a bracket 18, fastened securely to the end wall 3 of the tank, thereby functioning to provide a means for holding one end of the cylinder 8 in rotatable relationship to the tank 1, as well as means for allowing the food to be delivered into the apparatus for the purpose of washing and cleaning. The forward end of the cylinder 8 is provided with an opening 19 for the purpose of allowing the food to deliver into the pocket member 7.

The tank portions 1 and 5 are adapted to be supplied with a suitable amount of washing or cleaning liquid, as clearly disclosed at 20. In order to insure a proper circulation of the cleaning liquid, which percolates through the perforations 9 into the cylinder 8, it is preferred in this invention to provide a spiral member 21, made of any suitable material, such as sheet metal, securely fastened to a spindle 22, which functions to rotate by means of some suitable power through a wheel 23 and belt connection 24, located at the outer end of the spindle or shaft 22. Suitable bearings 25 and 26 are securely fastened to wall portions of the tank in order to properly support the spindle 22 in rotatable position.

The spiral blade is preferred, in this invention, to be welded or otherwise secured along its outer periphery to the shell of the cylinder 8, and securely fastened along its inner periphery to the spindle member 22. It is to be understood that the spiral conveyor within the cylinder 8 may be of any type suitable for the purpose, the most common of which consists of a rotatable spindle 28 having securely keyed thereto a shaft or spindle sleeve portion 22, as clearly disclosed in Fig. 1.

The pocket member 7 is preferably made of a form disclosed in Fig. 1 and Fig. 3, wherein an inwardly extending portion 29 is securely connected with the revolving cylinder 8, and the shaft or spindle 28, and positioned in such a manner as to register with the opening 19 in the cylinder 8. The main body portion of the pocket 7 is provided with an opening 30 and a suitably formed door 31, which may be hinged or otherwise to one side of the opening 30, as at 32. Obviously, when the pocket 7 has been rotated to a position as disclosed in Fig. 3, the door 31 will function to drop open, and the cleaned or washed food, such as oysters, are allowed to fall into a delivery chute 33, from which the food may drop into a receptacle 34.

In order to insure the automatic operation of the opening and closing of the door 31, a guide or cam member 35 is provided, made of any suitable material such as iron or the like, and firmly held in position against a wall 36 of the auxiliary portion of the tank 6 by means of bracket elements 37, 38, 39, and 40.

During the rotation of the cylinder 8 and the pocket 7, the door will be held in closed position by means of sliding contact with the guide 35, until the opening in the guide 41 is reached, when the door will drop open and the oysters or food allowed to flow into the chute 33.

It is preferred in this invention to provide a suitable drain plug 42 in the auxiliary portion of the tank 6.

Fig. 1 illustrates one means for mounting the rotatable shaft 28 in the tank 1, wherein the bearing 25 is in an opening of the chute 16.

In order to provide means for allowing the food to drop freely into the pocket 7 from the cylinder 8, and to prevent the cleaned food from falling back into the cylinder 8, when it is about to fall into the delivery chute 33, a curved portion 43 is formed on the wall section 29, as shown in Figures 1 and 6.

Fig. 6 discloses a modification of this invention wherein the scoop member, for receiving the oysters or other food as they flow from the cylinder 8, is formed having two pocket sections 44 and 45 connected together in open communication with each other. The outer wall 46 of the pocket is suitably formed and securely fastened to the revolving cylinder 8, while the inner wall portion 47 is provided at its free ends with curved members 48 and 49 for preventing the cleaned oysters from dropping back into the cylinder just previous to delivery into the receiving chute. The shaft member 22 is adapted to be securely fastened to the wall member 47 in such a manner that the rotation of the shaft 22 will cause the cylinder 8 and the pocket members 44 and 45 to revolve at the same time.

Door members 50 and 51 are pivotally mounted by means of hinges 52 and 53 to the wall member 47 of the double-ended scoop, in such a manner that when the scoop portion 45 is receiving the oysters or other food from the cylinder 8, the pocket member 44 is delivering the cleaned oysters practically free from the washing liquid into a delivery chute 54, the door having opened automatically for allowing the food or oysters to deliver therein.

The automatic means for holding the doors 50 and 51 in closed position and for opening them at the desired time, may consist of any suitable device, one form of structure for accomplishing this purpose is disclosed in Figures 6, 7, 8, and 9, wherein latch members 55 and 56 are pivotally mounted on the wall portions 57 and 58 of the pocket, as clearly disclosed at 59 and 60.

Lug portions 61 and 62 are formed preferably integrally with the latch members. One end of each latch member, 55 and 56, is provided with a hook member, 63 and 64, adapted to cooperate with pins 65 and 66, extending from the door members 50 and 51. As the pocket sections 44 and 45 revolve the latch members and lug member of the latch 56 function to contact with trip member 67, made of any suitable material, such as spring steel or the like, and adapted to be fastened in some proper manner to the main frame 68 of the tank portion 5, as at 69.

The trip member 67 is formed having a flanged portion 70 provided with a notched portion 71, formed in such a manner that when the lug 62 reaches a pre-determined point in its movement, it will automatically release from contact with the trip member, and the latch will snap back into the position for cooperating with the pins 66 extending from the door, thereby firmly holding the door in closed position for another revolution of the pocket.

In order to efficiently hold the latch member 55, as clearly disclosed in Figure 10, in interlocked relationship with the door 51, it is preferred in each instance to provide a spring member 72.

When the pocket is in position, as disclosed in Figure 6, the door 51 has been released and dropped into the chute 54, a sufficient distance for allowing the food to flow therein.

A guiding member 73, made of any proper material such as spring steel, is preferably attached at one end to the chute 54, as disclosed at 74, the free end of the guiding member 73 being so arranged within the chute 54 that the door 50 will be allowed to open within the chute just the proper distance for allowing the food to flow therein, and after this has been accomplished the door, revolving with the scoop members, contacts with the guiding element 73 and is forced upward to a closed position, as shown in Figure 9, at which time the latch lug member 62 has left the guiding member 67, thereby causing the door to be firmly locked in closed position.

It is to be understood that the arrangement of latch members 55 and 56, trip member 67, and guiding member 73 must be carefully adjusted so that they will function to allow the doors to open and close automatically at the pre-determined time.

The tank 1 in this invention is preferred to be provided with side wall portions 75 and 76, the upper longitudinal edge of one of the side wall portions, for instance 76, is constructed lower than the upper longitudinal edge of the opposite side 75, in order that the scum, sediment, dirt and the like which accumulates on the surface of the washing liquid, may be discharged over upper edge 77 into a trough member 78, which is fastened to the side wall 76 in some suitable manner.

The side wall portion 79 of the auxiliary tank 5 is likewise provided with a trough-shaped member 80 for receiving the scum and overflow of the washing liquid. The trough-shaped members 78 and 80 are formed having inclined portions toward the center in order that the scum, sediment and dirt may be discharged through suitable drain pipes 81 and 82.

The bottom of the tank 1 is preferably formed having inclined portions 83 and 84 so that the cleaning liquid may drain therefrom as desired through a pipe 85.

In order to aerate the washing liquid, a perforated air pipe 86 is positioned within the tank 1. approximately as disclosed in Figure 1, below the revolving cylinder 8, and supported by means of bracket portions 87 on the bottom of the tank. The air pipe 86 is supplied with air through a pipe line 88.

It has been found from experience that the revolving cylinder should be cleaned periodically both inside and out, and therefore man holes 89 are located at intervals along the cylinder and are provided with suitable cover portions 90.

In order to provide means for forcing scum and sediment into the trough members 78 and 80, and water or liquid, perforated pipe lines 91 and 92 are located, as clearly disclosed in Figures 4 and 5, in such a manner that when the water is allowed to flow into the tank from the valves 93 and 94, it will produce a current that forces the scum and sediment across the tank into the troughs 78 and 80.

A supply of washing liquid may be obtained through a pipe line 95, which is located approximately as disclosed in Figure 5, the perforations in the pipe line 95 being such that they will approximately register with the perforations 9 in the cylinder 8.

The oysters to be treated are delivered into the apparatus through the receiving chute 16, and after passing through the cylinder 8, where they are aerated and thoroughly cleaned, they pass into a pocket which revolves with the cylinder and are raised to a position above the liquid level, thereby being thoroughly drained, after which the pocket door opens and the oysters are allowed to flow into a chute and from there deliver into a receptacle provided for the purpose.

In operation this invention provides a washing and cleaning apparatus for foods, which is particularly adapted for use in the washing and cleaning of shelled or shucked oysters. However, it may be readily and efficiently used for the purpose of washing and cleaning oysters before they are opened, or for other types of food. This apparatus is particularly adaptable for washing the oysters previous to canning or the like, and is of simple, inexpensive and efficient construction adapted to uniformly clean the shucked oysters and give them a final rinsing before the canning process. Obviously, in this device, there is little or no waste of the rinsing water.

It is understood that alterations and substitutions may be made in the above disclosure within the scope of the appended claims without affecting the spirit of this invention.

What I claim is:

1. A food cleaning and washing machine, comprising a tank for holding the cleaning liquid, a rotatably mounted receptacle within the tank for receiving the food, perforations in the receptacle through which the liquid may percolate, said receptacle having an opening in one end for receiving the food, the opposite end being provided with a pocket for receiving the food after passing through the receptacle, the pocket being arranged to revolve with the receptacle, said pocket having a closure element for the opening arranged in such a manner that when the pocket containing the cleaned food has revolved with the receptacle to a point above the cleaning liquid, the closure element will open and allow the cleaned and washed food to deliver into a suitable receptacle.

2. In a food cleaning device, comprising a tank, a driving shaft mounted within the tank, a cylindrical food receptacle mounted on the shaft, pocket member mounted thereon beyond the circumference of the tank to revolve with the cylinder and in open communication therewith, a spiral blade within the cylinder for propelling the food in the direction of the pocket.

3. In a food cleaning device, comprising a tank, a driving shaft mounted within the tank, a cylindrical food receptacle mounted on the shaft, a pocket member mounted thereon to revolve with the cylinder and in open communication therewith, a spiral blade within the cylinder for propelling the food in the direction of the pocket, the scoop having an outer and inner portion, and discharge openings and pivotally mounted doors for the openings.

4. In a food cleaning device, comprising a tank, a driving shaft mounted within the tank, a cylindrical food receptacle mounted on the shaft, a pocket member mounted thereon to revolve with the cylinder and in open communication therewith, a spiral blade within the cylinder for propelling the food in the direction of the pocket, the scoop having an outer and inner portion, and discharge openings and pivotally mounted doors for the openings, means for automatically opening and closing the doors.

5. In a food cleaning device, comprising a tank, a driving shaft mounted within the tank, a cylindrical food receptacle mounted on the shaft, a pocket member mounted thereon to revolve with the cylinder and in open communication therewith, a spiral blade within the cylinder for propelling the food in the direction of the pocket, the scoop having an outer and inner portion, said outer portion having a discharge opening, pivotally mounted doors for the openings, means for automatically opening and closing the doors, means for automatically locking the doors at a predetermined period in the revolution of the pocket.

6. A food cleaning machine comprising a tank adapted to be substantially filled with water, means for conveying food through the tank, and discharge means comprising a rotary pocket having a discharge opening facing inwardly beyond the circumference of the tank so as to discharge from a point above the tank.

7. The structure of claim 6, with a closure for the discharge opening, means for tripping said closure as it reaches the top, and means for reclosing said closure after the food has been discharged.

8. The structure of claim 6, in which the discharge pocket specified is secured to and rotates with the conveying means.

9. The structure of claim 6, with a discharge chute extending within the orbit of the rotary pocket.

In testimony whereof I affix my signature.

EDWARD T. McNANEY.